United States Patent
Banti et al.

(10) Patent No.: US 9,756,080 B2
(45) Date of Patent: *Sep. 5, 2017

(54) PROTECTING CONTENT FROM THIRD PARTY USING CLIENT-SIDE SECURITY PROTECTION

(71) Applicant: Microsoft Technology Licensing, LLC, Redmond, WA (US)

(72) Inventors: Edward T. Banti, Seattle, WA (US); Frank Byrum, Seattle, WA (US); Mayerber L. Carvalho Neto, Bellevue, WA (US); James R. Knibb, Kirkland, WA (US); Palash Biswas, Bellevue, WA (US); Christopher Barnes, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/202,875

(22) Filed: Jul. 6, 2016

(65) Prior Publication Data

US 2016/0337405 A1 Nov. 17, 2016

Related U.S. Application Data

(63) Continuation of application No. 14/608,735, filed on Jan. 29, 2015, now Pat. No. 9,418,244, which is a
(Continued)

(51) Int. Cl.
*H04L 29/06* (2006.01)
*G06F 21/62* (2013.01)

(52) U.S. Cl.
CPC .......... *H04L 63/20* (2013.01); *G06F 21/6263* (2013.01); *H04L 63/0263* (2013.01); *H04L 63/0435* (2013.01); *H04L 63/06* (2013.01)

(58) Field of Classification Search
CPC .................................................. H04L 63/0263
See application file for complete search history.

(56) References Cited

U.S. PATENT DOCUMENTS

| 5,960,080 A | 9/1999 | Fahlman et al. |
| 6,014,688 A | 1/2000 | Venkatraman et al. |

(Continued)

OTHER PUBLICATIONS

"Features of Exchange Server 2007", available at: http://www.microsoft.com/exchange/evaluation/features/default.mspx, Jun. 11, 2006.

(Continued)

*Primary Examiner* — Ali Shayanfar

(57) ABSTRACT

Architecture that employs encryption and storage of encryption keys to protect trusted client message content from an untrusted third-party hosted service. Each trusted user machine is configured to optionally apply security to messages. Rules determine when automatic protection is applied and the level of protection to apply. The trusted client automatically downloads the rules (or rules policies) from a trusted rules service and caches the rules locally. During composition, the rules analyze the message and automatically apply security template(s) to the message. The security template(s) encrypt the body of the message, but not the headers or subject. The untrusted message service processes the header and delivers the message to the correct recipient. The hosted service cannot view the contents of the message body, and only intended recipients of the protected message can view the message body. Offline protection is supported, and the user can override protection by the rules.

19 Claims, 14 Drawing Sheets

Related U.S. Application Data continuation of application No. 12/356,098, filed on Jan. 20, 2009, now Pat. No. 8,978,091.

(56) References Cited

U.S. PATENT DOCUMENTS

| | | | |
|---|---|---|---|
| 7,430,754 B2 | 9/2008 | Speare | |
| 7,475,422 B1* | 1/2009 | Bull | G06Q 10/107 709/204 |
| 7,519,987 B1* | 4/2009 | Holt | G06F 21/31 707/999.003 |
| 8,364,800 B2* | 1/2013 | Bice | H04L 29/06 709/223 |
| 8,978,091 B2 | 3/2015 | Banti et al. | |
| 9,418,244 B2 | 8/2016 | Banti et al. | |
| 2004/0123153 A1 | 6/2004 | Wright | |
| 2004/0203589 A1 | 10/2004 | Wang et al. | |
| 2005/0144242 A1 | 6/2005 | Marston et al. | |
| 2005/0210246 A1* | 9/2005 | Faure | H04L 12/583 713/167 |
| 2006/0010241 A1* | 1/2006 | Kudallur | G06F 21/562 709/229 |
| 2006/0031351 A1 | 2/2006 | Marston et al. | |
| 2006/0095771 A1* | 5/2006 | Appenzeller | H04L 9/006 713/171 |
| 2006/0248575 A1 | 11/2006 | Levow et al. | |
| 2007/0022172 A1* | 1/2007 | Anglin | G06Q 10/10 709/207 |
| 2007/0113101 A1* | 5/2007 | LeVasseur | H04L 51/14 713/189 |
| 2007/0261099 A1 | 11/2007 | Broussard et al. | |
| 2008/0052395 A1 | 2/2008 | Wright | |
| 2008/0066148 A1 | 3/2008 | Lim | |
| 2008/0083036 A1 | 4/2008 | Ozzie | |
| 2008/0109679 A1 | 5/2008 | Wright | |
| 2008/0162924 A1 | 7/2008 | Chinitz | |
| 2008/0282155 A1* | 11/2008 | Kempanna | G06F 17/30867 715/273 |
| 2008/0289037 A1* | 11/2008 | Marman | H04L 12/585 726/22 |
| 2008/0297305 A1* | 12/2008 | Little | H04L 67/02 340/5.1 |
| 2009/0089390 A1* | 4/2009 | Fein | G06F 15/16 709/207 |
| 2009/0150970 A1 | 6/2009 | Hinds | |
| 2009/0157828 A1* | 6/2009 | Agrawal | G06Q 10/107 709/206 |
| 2009/0177704 A1* | 7/2009 | Consul | G06Q 10/107 |
| 2009/0282113 A1* | 11/2009 | Blakeman | G06Q 10/107 709/206 |
| 2009/0323636 A1 | 12/2009 | Dillon | |
| 2010/0031309 A1* | 2/2010 | Gale | G06Q 10/107 726/1 |
| 2010/0042690 A1* | 2/2010 | Wall | H04L 51/046 709/206 |
| 2010/0064341 A1* | 3/2010 | Aldera | H04L 63/102 726/1 |
| 2010/0094809 A1* | 4/2010 | Consul | H04L 51/22 707/662 |
| 2010/0153696 A1 | 6/2010 | Beachem | |

OTHER PUBLICATIONS

"Liquid Machines Email Control for RMS", available at: http://www.cmdsolutions.com/pdfs/LMEC%20for%20Windows%20RMS%20datasheet%20-%20FINAL.pdf, Nov. 15, 2004, 6 pages.

"Microsoft Adds Rights Management to Email", available at: http://windowsitpro.com/Articles/Index.cfm?ArticleID=38326, Nov. 11, 2003.

"Microsoft Windows Rights Management Services with Service Pack 2 (RMS SP2) Now Available", available at: http://www.microsoft.com/windowsserver2003/evaluation/overview/technologies/rmenterprise.mspx, Nov. 4, 2003.

"NCipher secures rights management services for GigaTrust", available at: http://www.ncipher.com/~/media/Files/Case%20Studies/gigatrust.aspx, Feb. 25, 2004, 5 pages.

"Security Enhancements in Windows Vista", available at: http://download.microsoft.com/download/8/1/2/8120652c-9abe-4dd4-b295-dcf69e770a87/WindowsVistaSecurity.doc, May 2007.

U.S. Appl. No. 12/356,098, Amendment and Response filed Feb. 7, 2012, 8 pages.

U.S. Appl. No. 12/356,098, Amendment and Response filed Sep. 10, 2012, 9 pages.

U.S. Appl. No. 12/356,098, Amendment and Response filed Apr. 1, 2014, 13 pages.

U.S. Appl. No. 12/356,098, Amendment and Response filed Oct. 3, 2014, 14 pages.

U.S. Appl. No. 12/356,098, Notice of Allowance mailed Oct. 29, 2014, 15 pages.

U.S. Appl. No. 12/356,098, Office Action mailed Nov. 7, 2011, 17 pages.

U.S. Appl. No. 12/356,098, Office Action mailed Jun. 8, 2012, 19 pages.

U.S. Appl. No. 12/356,098, Office Action mailed Dec. 11, 2013, 24 pages.

U.S. Appl. No. 12/356,098, Office Action mailed Jul. 3, 2014, 24 pages.

U.S. Appl. No. 14/608,735, 312 Amendment filed Jul. 5, 2016, 3 pages.

U.S. Appl. No. 14/608,735, Amendment and Response filed Jan. 11, 2016, 15 pages.

U.S. Appl. No. 14/608,735, Notice of Allowance mailed Apr. 14, 2016, 13 pages.

U.S. Appl. No. 14/608,735, Office Action mailed Aug. 26, 2015, 20 pages.

U.S. Appl. No. 14/608,735, Response to 312 Amendment mailed Jul. 19, 2016, 2 pages.

U.S. Appl. No. 14/608,735, Supplemental Amendment and Response filed Mar. 25, 2016, 6 pages.

* cited by examiner

PROTECTING CONTENT FROM THIRD PARTY USING CLIENT-SIDE SECURITY PROTECTION

CROSS-REFERENCE TO RELATED APPLICATIONS

This application is a continuation application of U.S. patent application Ser. No. 14/608,735, entitled "PROTECTING CONTENT FROM THIRD PARTY USING CLIENT-SIDE SECURITY PROTECTION," filed on Jan. 29, 2015, now issued U.S. Pat. No. 9,418,244, which is a continuation application of U.S. patent application Ser. No. 12/356,098, entitled "PROTECTING CONTENT FROM THIRD PARTY USING CLIENT-SIDE SECURITY PROTECTION," filed on Jan. 20, 2009, now issued U.S. Pat. No. 8,978,091, the entire disclosures of which are hereby incorporated herein by reference.

BACKGROUND

For most customers, the prospect of moving to hosted message service is appealing from a total-cost-of-ownership perspective, but a subset of those customers prioritize the security of their information over any cost savings obtained from a hosted delivery model. Organizations deal with confidential material related to daily business or activities. At the same time, many organizations are considering a switch to hosted services to reduce information technology (IT) costs and burden. Customers want the benefits of hosted application services without compromising security. A subset of customers is unwilling to share any information with a third-party service provider.

In order for those organizations to move to a hosted e-mail service, for example, the organizations want to trust that the service provider was not accessing confidential e-mails of the organization without permission. However, few options, if any, exist in preventing access to the data organization by a third party administrator. Thus, a problem that organizations face is how to protect sensitive data from disclosure to the third party service provider while also obtaining the benefits of reduced IT expenses. To unblock hosted e-mail, for example, a mechanism needs to be provided to secure customer e-mail from the third-party service provider.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture employs security rules that facilitate encryption and storage of encryption keys to protect client message (e.g., e-mail) content of a trusted client from an untrusted third-party hosting service through which the message is processed and routed. An administrator of the trusted (e.g., on-premises) organization can define policies for use in the untrusted service for determining if security rules should be applied to messages leaving that trusted organization. For example, the organization administrator can define a policy in the untrusted online mail service that all messages sent from users in a department called "Research" are protected by default with a specific rights template "Research Confidential".

To enable protection of client message content, each trusted user machine is configured to optionally apply security (e.g., rights management) to its outgoing messages. In other words, if the trusted client message is to be sent through a trusted message service, security may not be applied to the message. However, if the message is sent through an untrusted service, the client can apply security rules to the message such that the untrusted service cannot intentionally or unintentionally expose the message content and/or attachments.

Based on rules and policies defined by the administrator the security (or protection) rules are applied in the form of security (or rights) template(s) against the messages leaving the trusted organization to determine when automatic protection is applied and the level of protection, for example. Alternatively or in combination therewith, an administrator of the hosted (or untrusted) application can define and apply rules (or policies) within the untrusted message server that determine when automatic protection is applied to messages and the level of protection.

A security rule can be composed of a set of predicates, an action, and additional configuration information. The predicates can include sender and recipient information (e.g., constraints), the action can include zero, one, or more security templates to be applied to the message that specify what actions the recipient can take on the message, and the configuration information includes the ability to delegate control of the security rules to the user. More specifically, the user to override the protection of certain security rules.

When the client message program is configured for interfacing to the untrusted message service, the client program automatically downloads the rules defined by the administrator of the trusted organization (and in accordance with organization policies), and caches the rules locally (in association with the client). When composing a new message, a security component associated with the trusted client application analyzes the message using the security rule predicates and automatically applies the corresponding security template(s) to the message. Typically, one security rights template is applied.

If the user changes the recipients on the message, for example, the message is re-evaluated and the protection is left unchanged or removed. Periodically, the client polls a trusted rules service for rules-based policies that have been added or modified; in which case, the policies are re-downloaded and the associated security rules are cached locally. Offline protection during message composition is also supported.

A result is the security template(s) encrypt the body and attachments of the message, and not the headers or subject. Once sent, the untrusted message service processes the message headers and delivers the message to the correct recipient. The untrusted service cannot view the contents of the message body, thereby relegating the untrusted message service to strictly routing the message. Moreover, only intended recipients of the protected message can open the message body for viewing.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
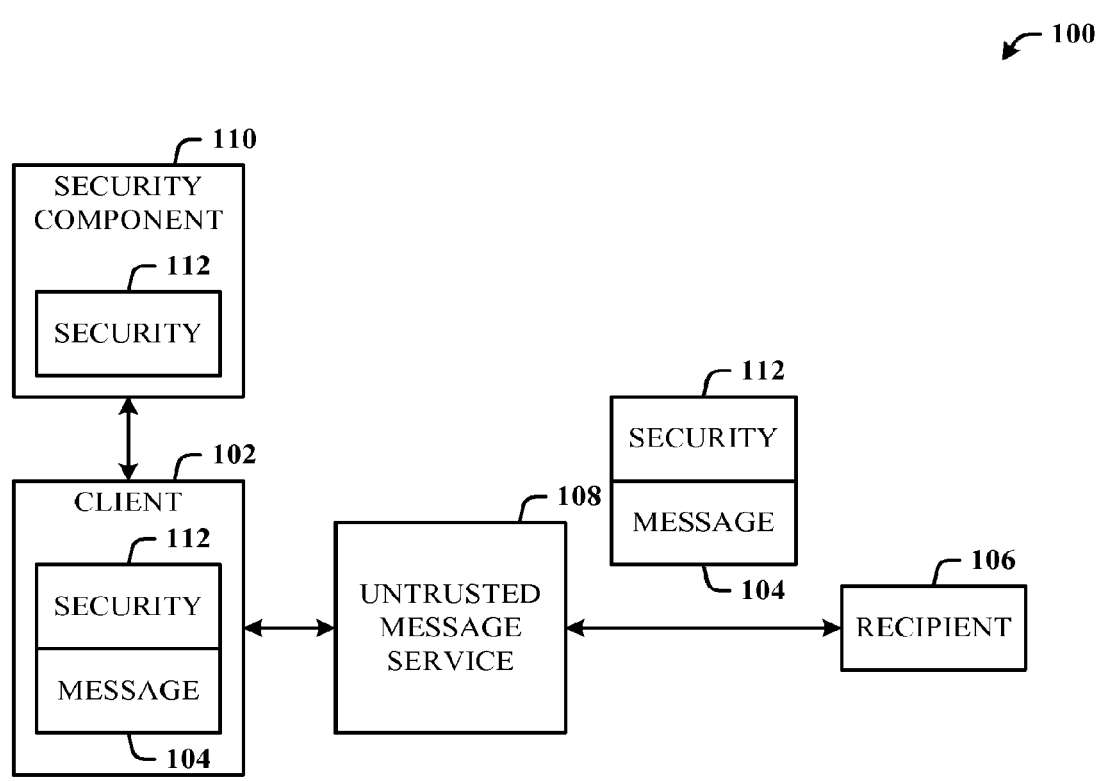
FIG. 1 illustrates a computer-implemented messaging system in accordance with the disclosed architecture.

The disclosed architecture employs security protection (e.g., encryption) and storage (e.g., at a trusted location) of encryption keys to prevent exposure of message content of messages (e.g., e-mail) to an untrusted hosted application (e.g., third-party e-mail message service) that can handle (e.g., route) the messages. In addition, the protection can be applied broadly or narrowly using rules (or rules policies).

All messages from a user in a particular department (e.g., a trusted location), for example, can be protected, as well as all messages sent to specific recipients (users and/or distribution lists). All internal messages (within an organization) can be protected. An administrator can define whether protection is optional, and can be overridden by the sender, for example.

A set of management configuration tasks is provided that allow the administrator (e.g., of the trusted organization) to create policies for the untrusted service and to create, remove, modify, and retrieve client rules (e.g., using get/set tasks). The administrator can also define an update interval for the client to poll the rules service for changes in the policies. Each client rule is a collection of predicates that trigger the trusted client to apply a security template to the message (and attachments) during or after recipient changes, or during message composition, for example. The rules can execute in an order of priority which determines the order in which rules are processed and applied to the message to be protected.

Note that where the description uses the terms "on-premises" and "off-premises", on-premises can mean a trusted location, whereas off-premises can be an untrusted location. However, a trusted service does not necessarily need to be at an on-premises or trusted location.

As described herein, a rule or set of rules can be defined as a policy by the on-premises administrator. One or more policies can then be downloaded to the trusted client cache for processing as part of message creation and protection. For example, a policy can be assigned to users from a particular department such that the associated departmental messages are protected in a certain way from exposure through an untrusted message service. In another example, a policy can be cached in the trusted client and that when applied encrypts messages to one recipient of a department, but not another recipient of the same department. In other words, the granularity of the protection can be managed according to the rules.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented messaging system 100 in accordance with the disclosed architecture. The system 100 includes a trusted client 102 for sending a message 104 to a recipient 106 using an untrusted message service 108, and a security component 110 for automatically applying security 112 to the message 104 in response to using the untrusted message service 108. The client 102 and the security component 110 can both be at a trusted location and the untrusted message service 108 can be off-premises at an untrusted location. The security 112 includes encryption of portions of the message 104 and storage of an associated encryption key in a trusted location. The security 112 can include encrypting a body and/or attachment(s) of the message 104 so the untrusted message service 108 cannot read the message body or attachment(s).

There are many different types of encryption systems other than rights management (authentication to a rights management service that returns key(s) that protect a document). For example, there can be shared keys between the users. Security can be provided by any kind of encryption system that is associated with management keys that the sender and recipient share, as well as keys that are accessible through a simple service. When the recipient opens the received document for the message, communication can be back to the security component 110 (e.g., a rights management server) for authentication, permission, keys, and unlocking of the contents at the recipient.

Security can work just as well in a data synchronization system where information is shared between two computers owned by the same user, rather than two different users. The user owns a key that is inaccessible to anyone else. A client-side protection agent encrypts the data using the key when input to the data synchronization system, stores the encrypted data into the data synchronization system, puts the key on the other user computer, and encrypts the indicia that identifies where that key is also stored. The user computer or the user can open the content on the other computer, and the data synchronization system never gains access to the data.

Another variation for encryption employs a key server to search a key for an intended recipient. In an e-mail implementation, the message can be encrypted using S/MIME (secure multipurpose Internet mail extensions), for example, the client looks in advance to find the public user recipient and encrypts the message for the user and before the message enters the service. The recipient already has the key.

Figure 2:
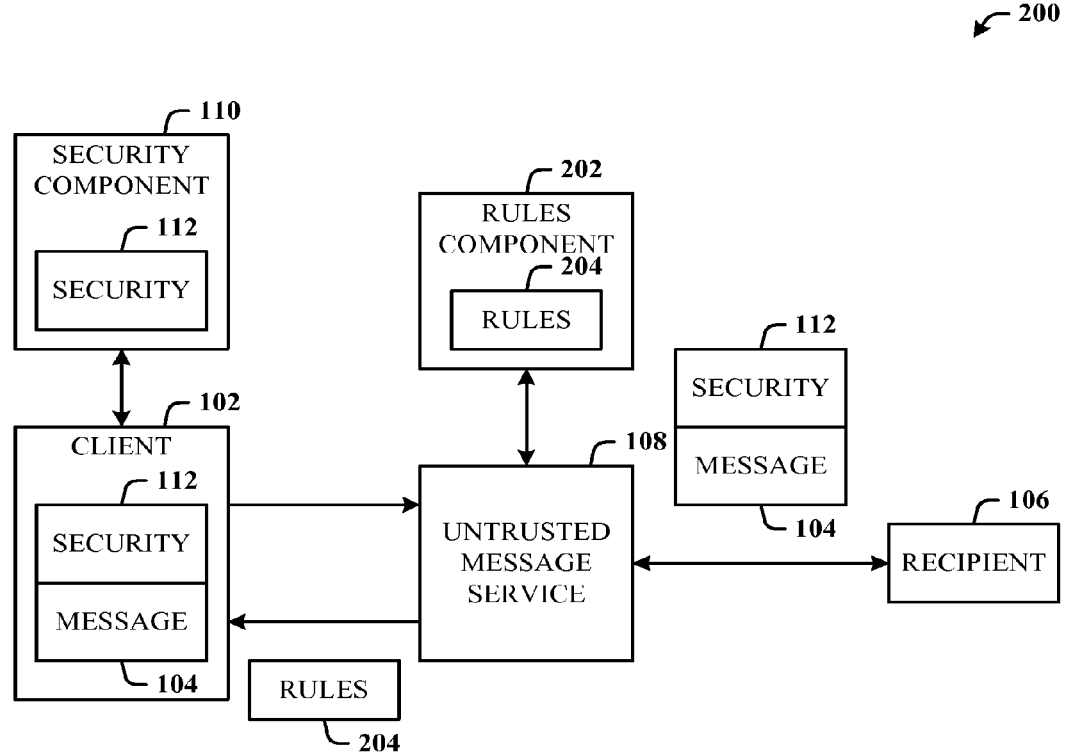
FIG. 2 illustrates an alternative embodiment of a messaging system that includes a rules component for applying the security according to rules.

FIG. 2 illustrates an alternative embodiment of a messaging system 200 that includes a rules component 202 for applying the security 112 according to policy rules 204. The system 200 includes the client 102 for sending the message 104 to the recipient 106 using the untrusted message service 108, and the security component 110 for automatically applying the security 112 to the message 104 in response to using the untrusted message service 108.

The rules component 202 is associated with the untrusted message service 108 for creating the policy rules 204 off-premises and evaluating the message 104 based on the policy rules 204 when using the untrusted message service 108. The client 102 automatically downloads and caches the policy rules 204 to be used for evaluating the 104 message when transmitting the message 104 via the untrusted message service 108. The policy rules 204 can include at least one of a predicate, an action, or configuration information. The trusted client 102 is a messaging client that automatically polls a trusted rules service (e.g., the rules component 202) for changes and/or updates to the policy rules 204 and downloads the changed and/or updated policy rules for evaluation of the message 104. Alternatively, the client 102 can poll and download rules from an on-premises rules service (or rules repository), not shown, rather than polling and downloading from the untrusted location. The message 104 can be evaluated according to the policy rules 204 during an offline mode of the client 102 and the security 112 can be applied during the offline mode.

As before, the client 102 and the security component 110 can both be on-premises entities and, the untrusted message service 108 and the rules component 202 can be off-premises entities. The security 112 includes encryption of portions of the message 104 and storage of an associated encryption key at a trusted location. The security 112 can include encrypting a body of the message 104 so the untrusted message service 108 cannot read the message body.

In the context of the message being an e-mail message and with respect to initialization and analysis, when the user configures the client e-mail program (e.g., a personal information manager (PIM) that includes e-mail capability) for the untrusted message service 108 (which now is a hosted e-mail service), the e-mail client (e.g., trusted client 102) automatically downloads the policy rules 204 at the hosted e-mail service and caches the policy rules 204 locally (in association with the client 102).

When the user begins composing a new message in the e-mail program, the policy rules are applied to the e-mail to analyze the e-mail using the predicates, and the security 112 (e.g., one or more templates) is automatically applied to the e-mail. Based on changes the user makes when composing the e-mail, the e-mail is automatically re-evaluated for the same or different security. For example, if the user changes the recipients on the e-mail, the e-mail is automatically re-evaluated. Based on the re-evaluation, the security 112 can be left unchanged or the security 112 can be removed (e.g., if the e-mail will then be routed through a trusted e-mail service).

Periodically, a trusted rules service (e.g., the rules component 202) can be polled to determine if the organization administrator has added or modified the policy rules 204. If so, the policy rules 204 (new and/or updated) are re-downloaded and cached locally in the client 102.

If the user is offline while composing a message, the message can still be evaluated using the cached policy rules 204, and the security 112 applied while the e-mail client is offline. The security component 110 provides the ability to apply security (protection) while the client 102 is offline. After sending, the message is stamped with one or more attributes, for example, the version of the analysis engine that ran on the message, the age of the rules, and/or whether the sender overrode the automatic protection.

Figure 3:
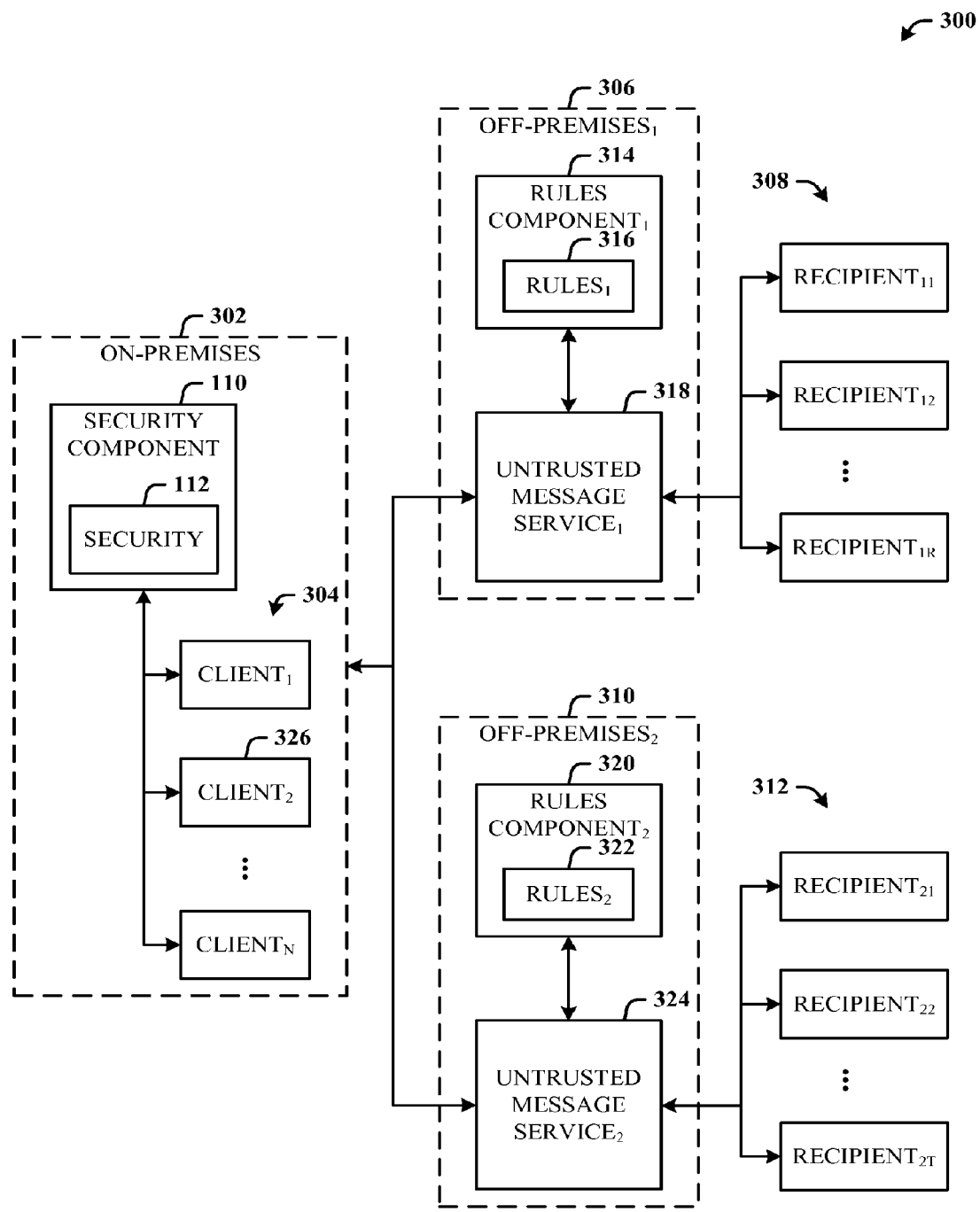
FIG. 3 illustrates a system where the trusted client can access multiple untrusted message services.

FIG. 3 illustrates a system 300 where a trusted client can access multiple untrusted message services. The user can have multiple mailboxes on the same untrusted (hosted) service, or different hosted services (a cross-premises multi-hosted service topology). In this cross-premises example, an on-premises (trusted) environment 302 includes the security component 110 for applying security 112 in the form of security templates to the messages created by trusted clients 304. One or more of the clients 304 can have multiple accounts to different off-premises (untrusted) services. For example, a first off-premises environment 306 can provide message services to multiple recipients 308 connected to the first environment 306. Similarly, a second off-premises environment 310 can provide message services to multiple recipients 312 connected to the second environment 310.

The first off-premises environment 306 can include a first rules component 314 that stores policy rules 316 (as policies), and a first untrusted message service 318. The first untrusted service 318 communicates messages, protected and unprotected, between the trusted clients 304 and the recipients 308. Similarly, the second off-premises environment 310 can include a second rules component 320 that stores policy rules 322 (as policies), and a second untrusted message service 324. The second untrusted service 324 communicates messages, protected and unprotected, between the trusted clients 304 and the recipients 312.

When configured, the trusted clients 304 each download and store (e.g., cache) the policy rules 316 and the policy rules 322 from trusted rules services (e.g., the first rules component 314 and the second rules component 320). Thus, when composing a message via a second trusted client 326, one or both sets of the policy rules (316 and 322) stored local to the second client 326 are processed to determine the security 112 (e.g., template(s)) to be applied to the message. It is to be appreciated that once a single recipient, for example, Recipient$_{12}$ associated with the first off-premises environment 306, is identified, only the policy rules 316 are applied. However, if the distribution list for the message includes recipients associated with both the first and second off-premises environments (306 and 310), then both the policy rules (316 and 322) are processed.

In other words, it is possible that security can be applied differently for the same message being routed through two different untrusted services. In one implementation where multiple sets of policy rules can be applied to the same message, the highest level of security 112 (as obtained from the security component 110) needed for one recipient is applied to all recipients. Situations like this can be resolved according logical operations on the multiple rule sets such as AND, OR, etc., so that the optimum security is provided where desired.

Figure 4:
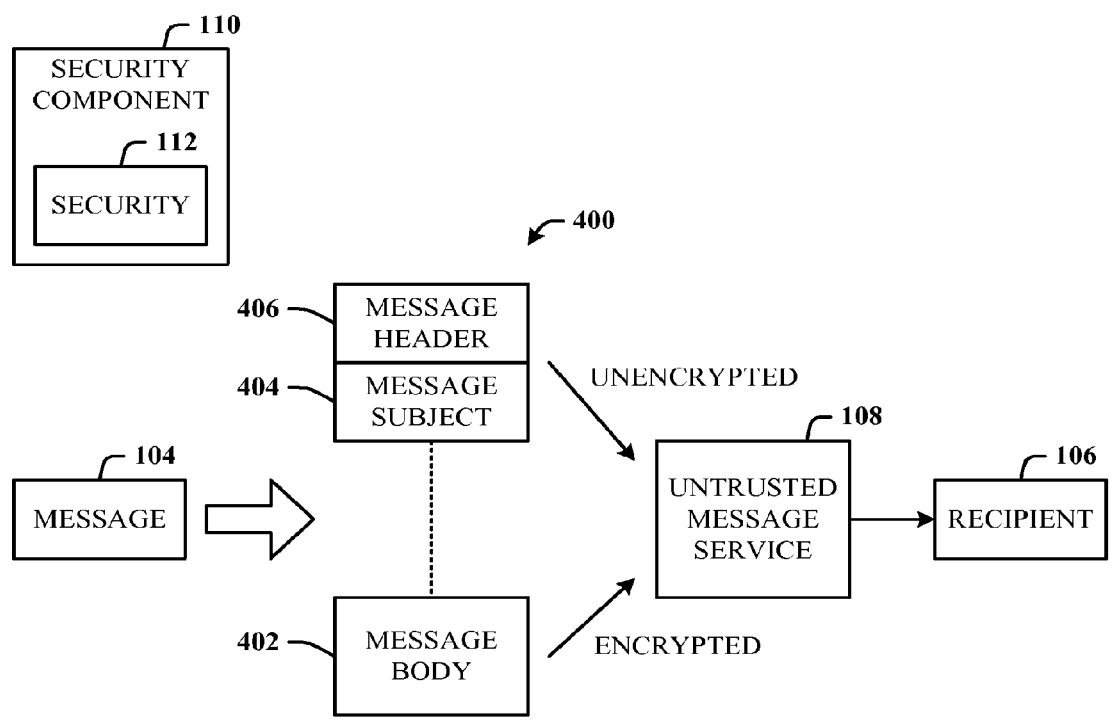
FIG. 4 illustrates security processing of a message for communications through the untrusted message service.

FIG. 4 illustrates security processing of a message for communications through the untrusted message service 108. The message 104 can be processed using constituent parts 400: a message body 402, a message subject 404, and a message header 406, for example. The on-premises security component 110 provides the security 112 in the form of encryption of the message body 402, while leaving the message subject 404 and message header 406 exposed. The encrypted and un-encrypted portions of the message 104 pass to the untrusted message service 108, and then to the recipient 106.

Once the message 104 is sent from the client machine of the sender, the untrusted message service 108 can process the header 406 and deliver the message 104 to the correct recipient 106. During this processing, the untrusted message service 108 (e.g., a hosted e-mail application) cannot view the contents of the message body 402, which precludes a third-party from doing anything other than routing the message 104. When a recipient of the message 104 receives and attempts to open the protected message body 402, only a recipient that is intended to receive the message 104 will be able to open the message body 402, that is, if specified as a recipient on the original message sent by the client user.

Figure 5:
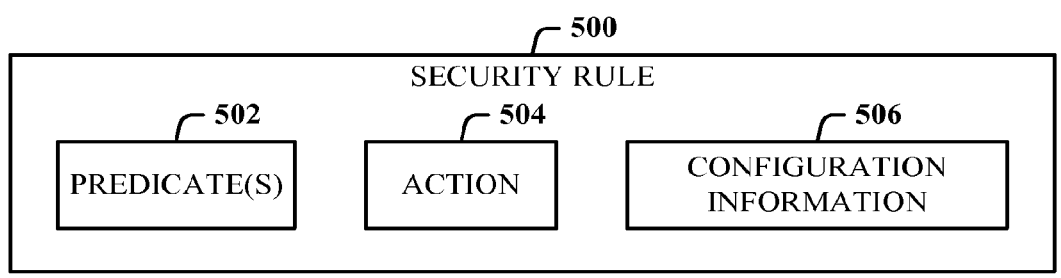
FIG. 5 illustrates a more detailed description of a rule.

FIG. 5 illustrates a more detailed description of a security rule 500 as provided by the security component. The security rules can be composed of one or more predicates 502, an action 504, and additional configuration information 506. In one implementation, the one or more predicates 502 can include the sender department (e.g., Sender Department Equals [String]), recipient information such as the recipient SMTP address, distribution list for the e-mail, and user alias for the recipient (e.g., Recipient Equals [SMTP Address, Distribution List, User Alias]), and distribution list location (e.g., All Recipients are Internal [True, False]) or user location for a single recipient. Additional properties for the security rule can include Name [String], Priority [#], User Can Override, and security Template to Apply [GUID].

These properties and predicates can be specified in the following tasks. For creating a new client rule: New-ProtectionRule [Name, Enabled, Priority, Sender Department, Recipient/DL, Internal, Security Template, User Can Override]. For modifying an existing client rule: Set-ProtectionRule [Identity, Name, Enabled, Priority, Sender Department, Recipient/DL, Internal, Security Template, User Can Override]. Moreover, the predicates can be combined with the logical AND operator within a single rule and the values can be combined with the logical OR operator.

When the user creates a new e-mail message, for example, the "Sender Department Equals" policy rules are evaluated (e.g., as the client window appears), and if triggered, the corresponding security template specified in the security rule is applied.

Once the user specifies a list of recipients (e.g., To, CC, and BCC) and finishes inputting the recipients (e.g., by clicking into the subject or body/check names), the client-stored policy rules are run against that list of recipients. The client policy rules can be run after the user has finished inputting all recipients to avoid multiple runs of the policy rules and impact on the user experience.

Messages sent by the client while the security client rules are enabled can include a custom MAPI (messaging application programming interface) property that indicates the add-in version (e.g., ProtectionRuleVersion) and the last date the rules were synchronized with the hoisted service (e.g., ProtectionRuleLastUpdated). This helps in the verification that the message was sent through a client with the protection add-in for untrusted services installed, enabled, and loaded with up-to-date rules. The MAPI properties can be elevated to an X-Header for later evaluation by transport rules.

When a security rule is triggered and the security template(s) applied, the user can be notified of this action through a user interface change. The selected template can change in a "Permission" menu and if the rule specifies "User Override=FALSE" the menu can be disabled (all items within the Permission menu, except for a "Manage Credentials" option).

If the user overrides the selected security template(s), a custom MAPI property (e.g., ProtectionRuleOverride) can be created on the message containing the GUID of the security rule that was triggered, therefore indicating that the security rule was overridden. This property can also be elevated to an X-Header so that transport rules can run on the message.

The security rules can be evaluated in a specific order based on the overrideable property and then based on priority, for example. First, all non-overrideable security rules can be evaluated by priority. Second, the overrideable security rules can be evaluated by priority. If a security rule is overridden by the user and the message recipients change, only the non-overrideable security rules are re-evaluated. For example, consider the following rule set:

Rule 1: Recipient equals "Team A" apply Security Template "Confidential" (Non-Overrideable)

Rule 2: Recipient equals "E-mail Team" apply Security Template "E-mail Only" (Overrideable)

Rule 3: Sender department equals "Finance" apply Security Template "Finance Only" (Overrideable)

In other words, if the user is a member of Team A and initially composes a message to the E-mail Team, then overrides security Rule 2, and then modifies the recipient to "Marketing Team", only security Rule 1 is re-evaluated.

If no recipients are specified on a message and the message is saved to a drafts folder, no further action is taken. Only the users that trigger "Sender Department Equals" have their message security protected without any recipients specified.

If the user receives a protected message and selects Reply or Forward operations on that message, the add-in rules are employed to re-evaluate the message. If the user has permission to modify the protection, the non-overrideable security rules are evaluated on the message; if triggered, disable the control can be disabled in the UI. This prevents the user from removing the protection only to see the protection re-applied to the message and keep the existing protection, therefore reducing user confusion. If the user changes the recipients on the protected message only the non-overrideable security rules are re-evaluated. If the user does not have permission to modify the protection, the add-in rules are not re-evaluated.

If the user invokes a send-on-behalf composition, or there are multiple untrusted accounts for a user, the identity of the message sender can be used when evaluating the rules. By default the default account specified in protection architecture can be used. For example, if User A has send-on-behalf permission for User B, and User A composes a message as User B, the message is evaluated based on the identity of User B.

With respect to multiple accounts, the user can have multiple mailboxes on the same hosted service or different hosted services (a cross-premises multi-hosted service topology).

The action 504 can be limited to the application of security (or rights management) templates which specify the actions the recipient can take on the message. These templates are created and managed by the security component (e.g., a rights management services server). With respect to the configuration information 506, an administrator can delegate control of this feature to the user; more specifically, the administrator can allow the user to override the protection of certain security rules.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
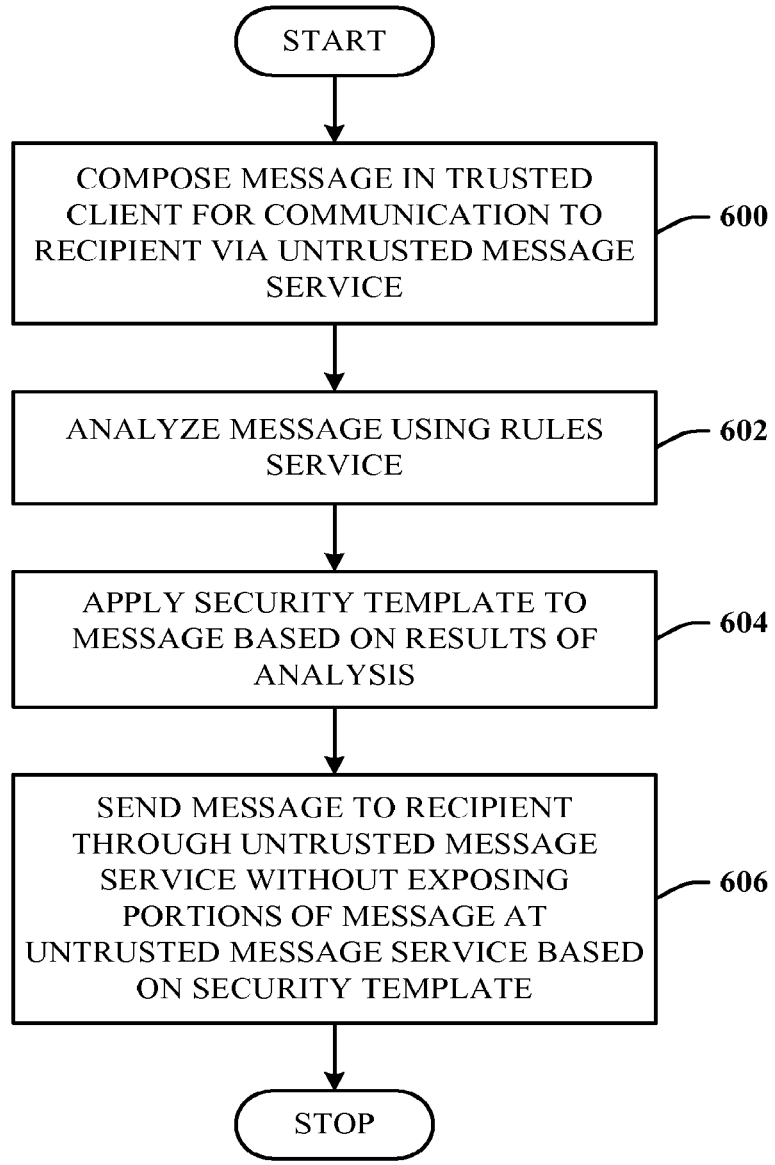
FIG. 6 illustrates a method of processing messages.

FIG. 6 illustrates a method of processing messages. At 600, a message in a trusted client is composed for communication to a recipient via an untrusted message service. At 602, the message is analyzed using a trusted rules service. At 604, a security template is selected and applied to the message based on results of the analysis (and security rules). At 606, the message is sent to the recipient through the untrusted message service without exposing portions of the message at the untrusted message service based on the security template.

Figure 7:
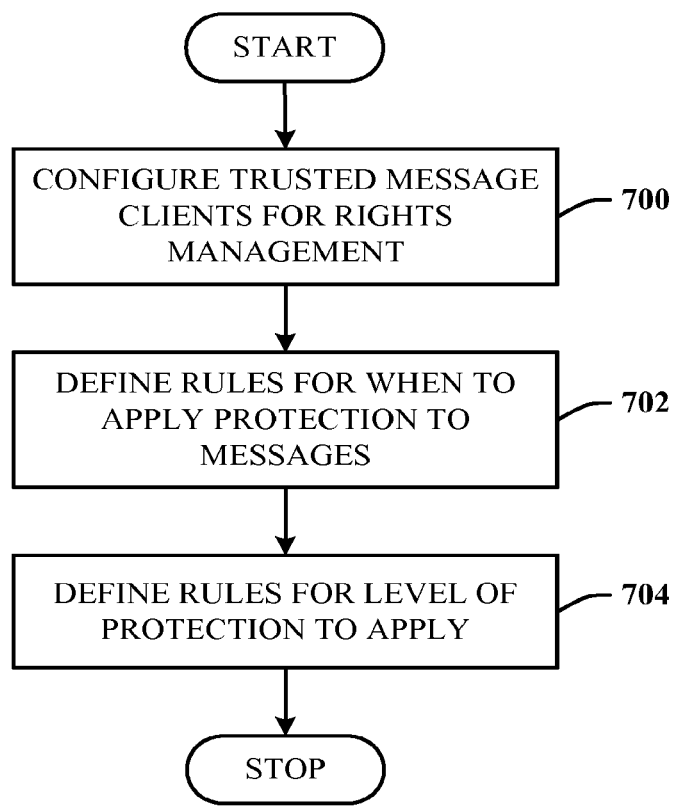
FIG. 7 illustrates a method of providing rules for message processing.

FIG. 7 illustrates a method of providing security rules for message processing. At 700, trusted message clients are configured for rights management. The rights management can be a security component that provides the security that is applied to the message. At 702, policy rules are defined for when to apply protection (e.g., encryption) to the messages. At 704, security rules are defined for the level of protection to apply to the messages.

Figure 8:
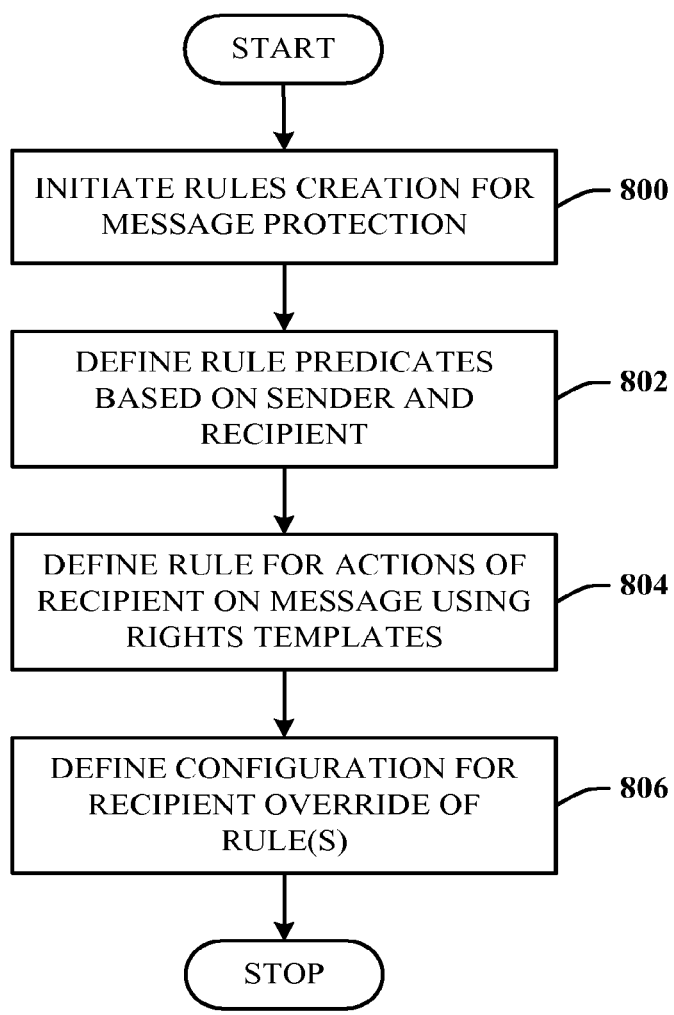
FIG. 8 illustrates a method of providing rules composition for analyzing a client message for protection.

FIG. 8 illustrates a method of providing rules composition for analyzing a client message for protection. At 800, rules creation is initiated for message protection (or security). At 802, rule predicates are defined based on a sender of the message and a recipient of the message. At 804, a rule action is defined for actions the message recipient can take based on rights (security) template. At 806, a configuration is defined for recipient override of the rule(s).

Figure 9:
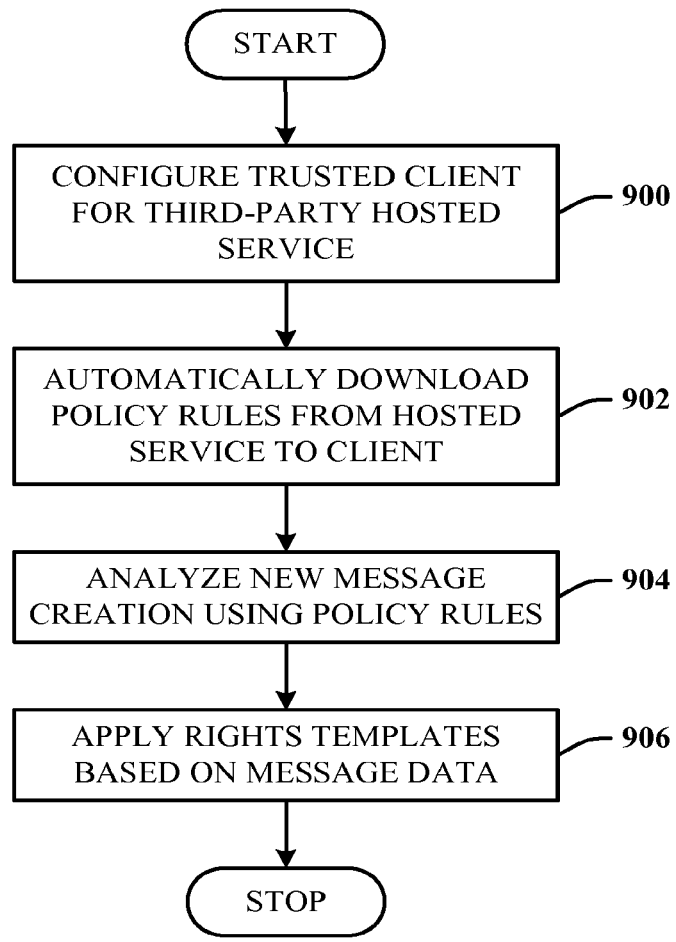
FIG. 9 illustrates a method of providing an on-premises client.

FIG. 9 illustrates a method of providing an on-premises client. At 900, the trusted client is configured for a third-party hosted service. At 902, policy rules are automatically downloaded from the hosted service. At 904, a new message is analyzed using the policy rules. At 906, one or more rights templates are applied based on the message data.

Figure 10:
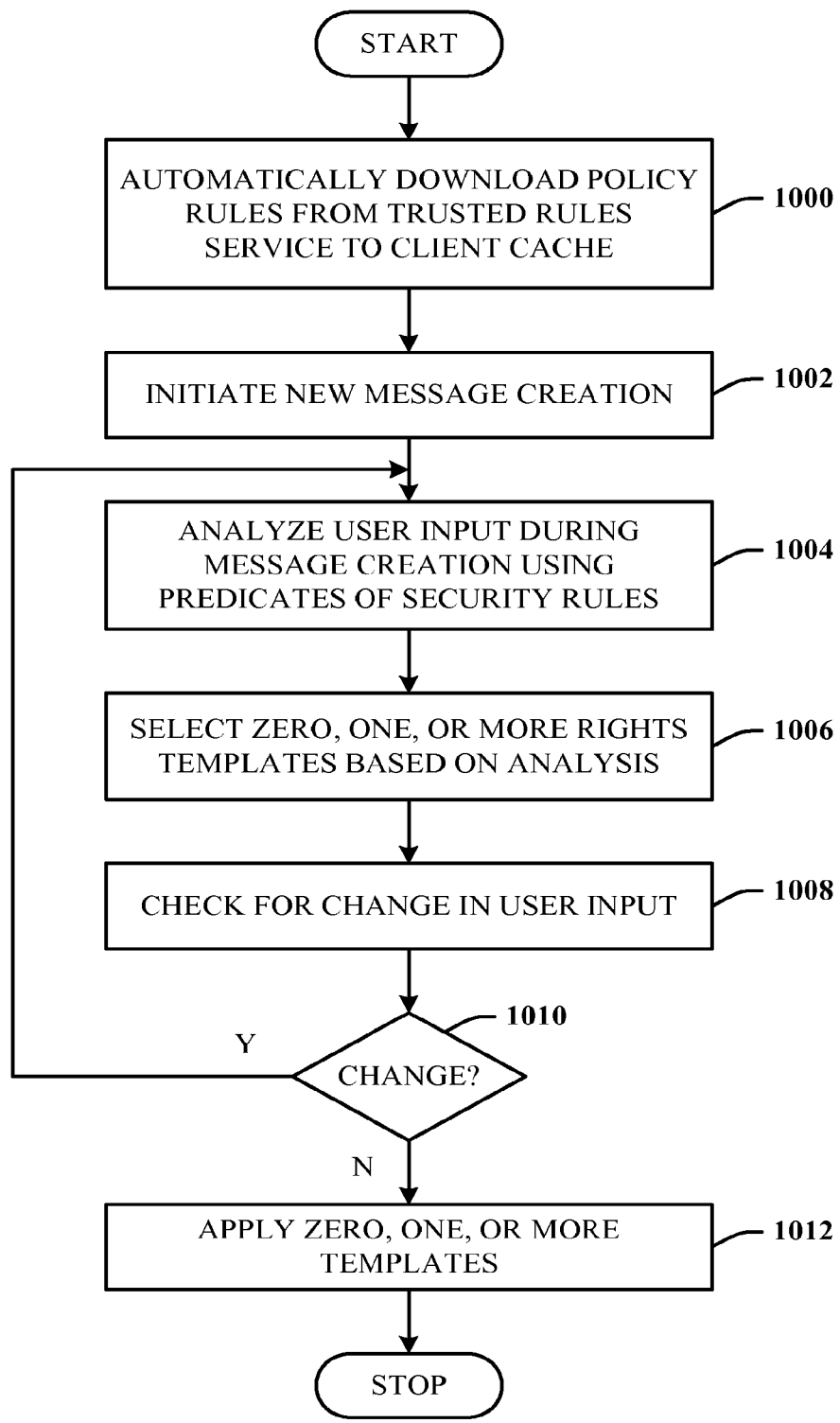
FIG. 10 illustrates a method of checking for update or new rules.

FIG. 10 illustrates a method of checking for updates or new policy rules. At 1000, policy rules are automatically downloaded from a trusted rules service to the client cache. At 1002, new message creation is initiated at the trusted client. At 1004, user input is analyzed during message creation using predicates of security rules as indicated by the policy rules. At 1006, zero, one, or more rights (security) templates are selected based on the analysis. At 1008, a check is made for changes to the user input. At 1010, if a change was made, flow is back to 1004 to re-perform the analysis based on the user changes. If no changes were made, flow is from 1010 to 1012 to apply the zero, one, or more templates.

Figure 11:
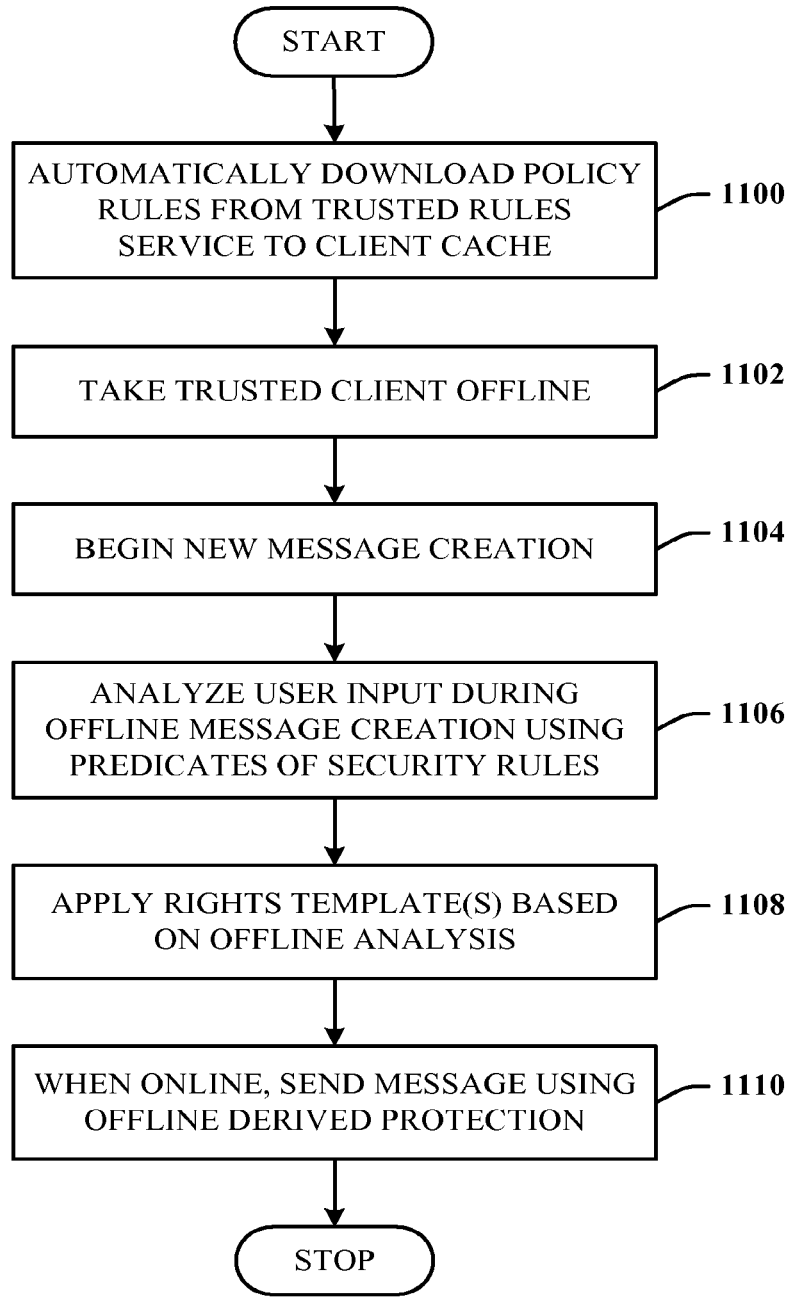
FIG. 11 illustrates a method of offline processing of message.

FIG. 11 illustrates a method of offline processing of a message on a client. At 1100, rules are automatically downloaded from a trusted rules service to the client cache. At 1102, the trusted client is taken offline. At 1104, new message creation is begun. At 1106, user input is analyzed during the offline message creation using the predicates of the security rules associated with the policy rules. At 1108, one or more rights templates associated with the security rules are applied based on the offline analysis. At 1110, when the trusted client is back online, the message is sent using the offline derived protection.

Figure 12:
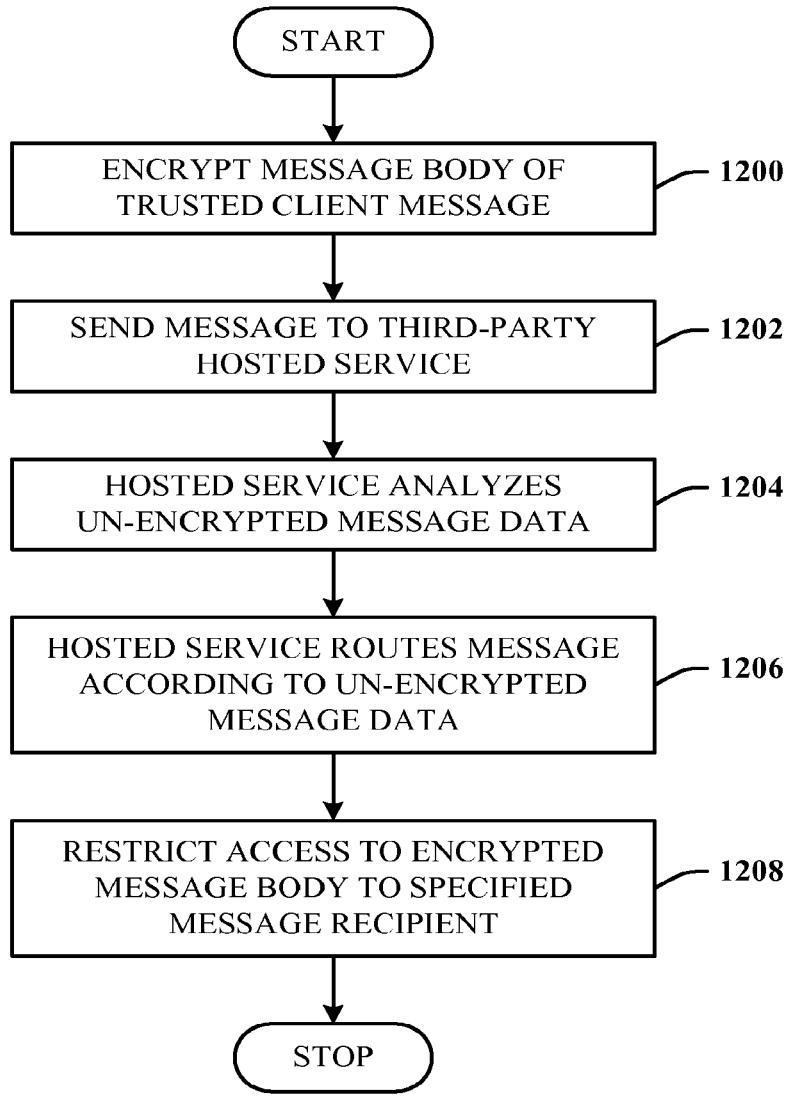
FIG. 12 illustrates a method of providing protection to a message based on a third-party untrusted service.

FIG. 12 illustrates a method of providing protection (security) to a message based on a third-party hosted service. At 1200, the message body of the trusted client message is encrypted. At 1202, the message is sent to the third-party hosted service. At 1204, the hosted service analyzes the un-encrypted message data. At 1206, the hosted service routes the message according to the un-encrypted message data. At 1208, access to the encrypted message body is restricted to a specified message recipient.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 13:
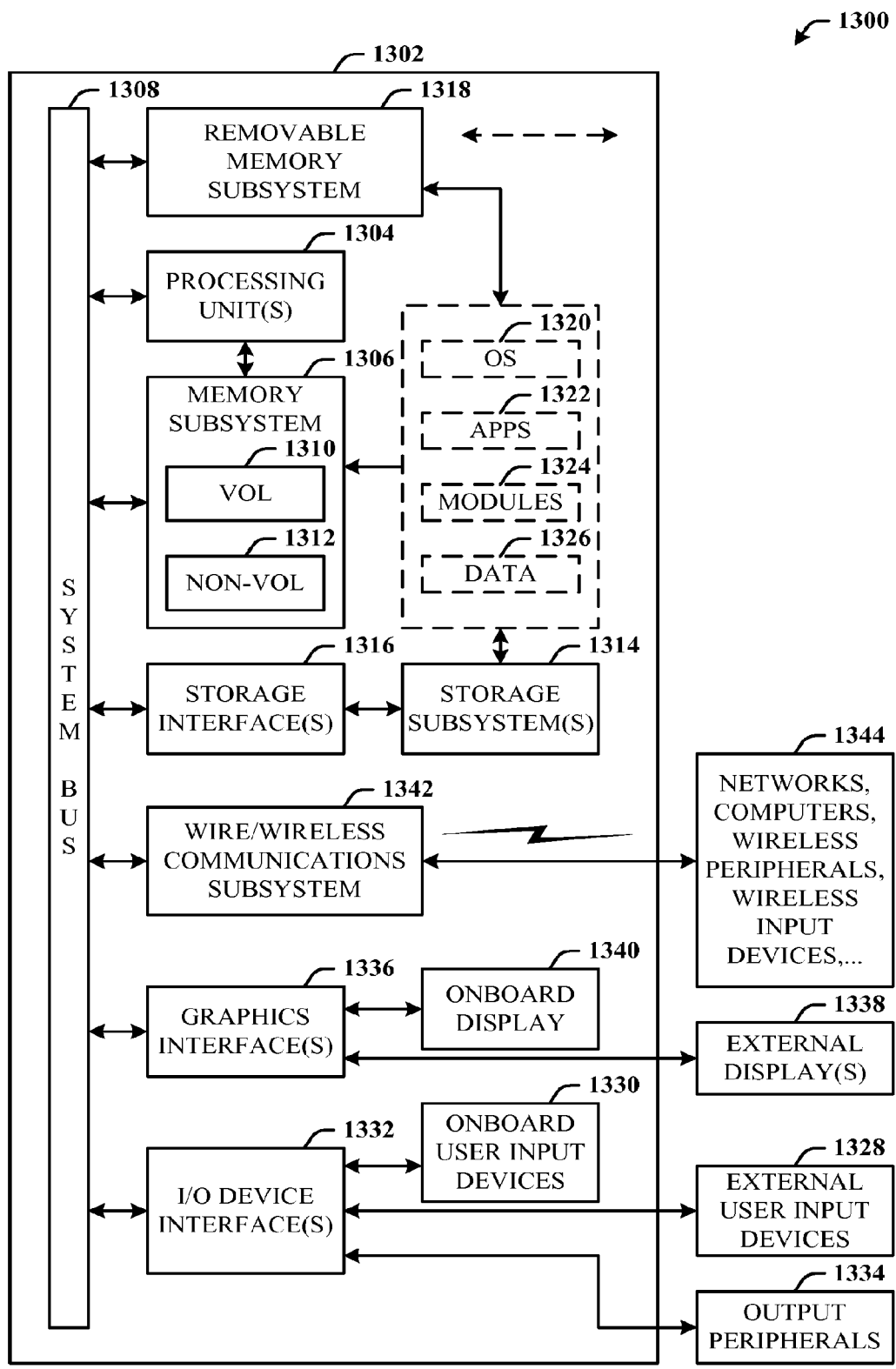
FIG. 13 illustrates a block diagram of a computing system operable to content protection in accordance with the disclosed architecture.

Referring now to FIG. 13, there is illustrated a block diagram of a computing system 1300 operable to content protection in accordance with the disclosed architecture. In order to provide additional context for various aspects thereof, FIG. 13 and the following discussion are intended to provide a brief, general description of the suitable computing system 1300 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1300 for implementing various aspects includes the computer 1302 having processing unit(s) 1304, a system memory 1306, and a system bus 1308. The processing unit(s) 1304 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1306 can include volatile (VOL) memory 1310 (e.g., random access memory (RAM)) and non-volatile memory (NON-VOL) 1312 (e.g., ROM, EPROM, EEPROM, etc.). A basic input/output system (BIOS) can be stored in the non-volatile memory 1312, and includes the basic routines that facilitate the communication of data and signals between components within the computer 1302, such as during startup. The volatile memory 1310 can also include a high-speed RAM such as static RAM for caching data.

The system bus 1308 provides an interface for system components including, but not limited to, the memory subsystem 1306 to the processing unit(s) 1304. The system bus 1308 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1302 further includes storage subsystem(s) 1314 and storage interface(s) 1316 for interfacing the storage subsystem(s) 1314 to the system bus 1308 and other desired computer components. The storage subsystem(s) 1314 can include one or more of a hard disk drive (HDD), a magnetic floppy disk drive (FDD), and/or optical disk storage drive (e.g., a CD-ROM drive DVD drive), for example. The storage interface(s) 1316 can include interface technologies such as EIDE, ATA, SATA, and IEEE 1394, for example.

One or more programs and data can be stored in the memory subsystem 1306, a removable memory subsystem 1318 (e.g., flash drive form factor technology), and/or the storage subsystem(s) 1314, including an operating system 1320, one or more application programs 1322, other program modules 1324, and program data 1326. Generally, programs include routines, methods, data structures, other software components, etc., that perform particular tasks or implement particular abstract data types.

The computer 1302 can be employed as a server machine and/or client machine. As an on-premises server and/or an on-premises client, the one or more application programs 1322, other program modules 1324, and program data 1326 can include the security component 110, security 112, client 102, message 104, the rules 204, the message body 402, message subject 404, message header 406, the components of the rule 500 (the predicate(s) 502, action 504, and configuration information 506), and methods of FIGS. 6-12, for example. Where the computer 1302 is employed for the untrusted message service 108, the one or more application programs 1322, other program modules 1324, and program data 1326 can include the untrusted message service 108, rules component 202 and rules 204, the first rules component 314 and rules (policies) 316, the second rules component 320 and rules 322 (policies), the untrusted service 318, and the untrusted service 324, for example.

All or portions of the operating system 1320, applications 1322, modules 1324, and/or data 1326 can also be cached in memory such as the volatile memory 1310, for example. It is to be appreciated that the disclosed architecture can be implemented with various commercially available operating systems or combinations of operating systems (e.g., as virtual machines).

The storage subsystem(s) 1314 and memory subsystems (1306 and 1318) serve as computer readable media for volatile and non-volatile storage of data, data structures, computer-executable instructions, and so forth. Computer readable media can be any available media that can be accessed by the computer 1302 and includes volatile and non-volatile media, removable and non-removable media. For the computer 1302, the media accommodate the storage of data in any suitable digital format. It should be appreciated by those skilled in the art that other types of computer readable media can be employed such as zip drives, magnetic tape, flash memory cards, cartridges, and the like, for storing computer executable instructions for performing the novel methods of the disclosed architecture.

A user can interact with the computer 1302, programs, and data using external user input devices 1328 such as a keyboard and a mouse. Other external user input devices 1328 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1302, programs, and data using onboard user input devices 1330 such a touchpad, microphone, keyboard, etc., where the computer 1302 is a portable computer, for example. These and other input devices are connected to the processing unit(s) 1304 through input/output (I/O) device interface(s) 1332 via the system bus 1308, but can be connected by other interfaces such as a parallel port, IEEE 1394 serial port, a game port, a USB port, an IR interface, etc. The I/O device interface(s) 1332 also facilitate the use of output peripherals 1334 such as printers, audio devices, camera devices, and so on, such as a sound card and/or onboard audio processing capability.

One or more graphics interface(s) 1336 (also commonly referred to as a graphics processing unit (GPU)) provide graphics and video signals between the computer 1302 and external display(s) 1338 (e.g., LCD, plasma) and/or onboard displays 1340 (e.g., for portable computer). The graphics interface(s) 1336 can also be manufactured as part of the computer system board.

The computer 1302 can operate in a networked environment (e.g., IP) using logical connections via a wired/wireless communications subsystem 1342 to one or more networks and/or other computers. The other computers can include workstations, servers, routers, personal computers, microprocessor-based entertainment appliance, a peer device or other common network node, and typically include many or all of the elements described relative to the computer 1302. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1302 connects to the network via a wired/wireless communication subsystem 1342 (e.g., a network interface adapter, onboard transceiver subsystem, etc.) to communicate with wired/wireless networks, wired/wireless printers, wired/wireless input devices 1344, and so on. The computer 1302 can include a modem or has other means for establishing communications over the network. In a networked environment, programs and data relative to the computer 1302 can be stored in the remote memory/storage device, as is associated with a distributed system. It will be appreciated that the network connections shown are exemplary and other means of establishing a communications link between the computers can be used.

The computer 1302 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 14:
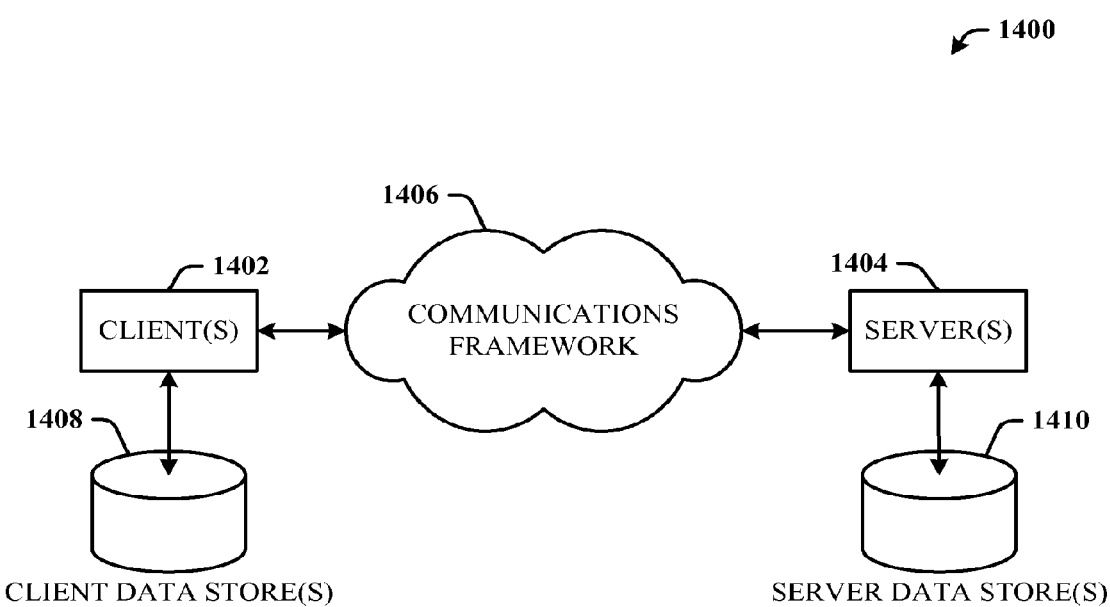
FIG. 14 illustrates a schematic block diagram of a computing environment that facilitates content protection for a message.

Referring now to FIG. 14, there is illustrated a schematic block diagram of a computing environment 1400 that facilitates on-premises content protection for message. The environment 1400 includes one or more client(s) 1402. The client(s) 1402 can be hardware and/or software (e.g., threads, processes, computing devices). The client(s) 1402 can house cookie(s) and/or associated contextual information, for example.

The environment 1400 also includes one or more server(s) 1404. The server(s) 1404 can also be hardware and/or software (e.g., threads, processes, computing devices). The servers 1404 can house threads to perform transformations by employing the architecture, for example. One possible communication between a client 1402 and a server 1404 can be in the form of a data packet adapted to be transmitted between two or more computer processes. The data packet may include a cookie and/or associated contextual information, for example. The environment 1400 includes a communication framework 1406 (e.g., a global communication network such as the Internet) that can be employed to facilitate communications between the client(s) 1402 and the server(s) 1404.

Communications can be facilitated via a wire (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

The client(s) 1402 can include the clients 304 and recipients 308 and 312. The server(s) 1404 can include the off-premises services (318 and 324), for example.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
    one or more processing units; and
    memory comprising instructions that when executed by at least some of the one or more processing units performs one or more steps, the one or more steps comprising:
        determining that an untrusted message service is being used to transmit a message to a recipient;
        analyzing the message using one or more rules from a rules component, wherein the one or more rules are used to generate security for the message, and wherein analyzing the message comprises:
            evaluating input during composition of the message;
            applying the one or more rules to the message;
            monitoring for changes to the input of the message; and
            when changes to the input are detected, reevaluating the input;
        applying the security to the message, wherein the security prevents a body portion of the message from being exposed at the untrusted message service, and wherein the security includes attaching one or more attributes of the security to the message, and wherein the security is applied in response to a determination that the untrusted message service is being used to send the message; and
        sending the message to the recipient using the untrusted message service.

2. The system of claim 1, further comprising:
    composing the message using a client computing device; and
    using the client computing device to transmit the secured message to the recipient.

3. The system of claim 2, wherein the rules component is associated with the untrusted message service, and wherein the rules component transmits the rules to the client computing device.

4. The system of claim 3, wherein the secured message is associated with a rules property, wherein the rules property indicates a date the rules of the client computing device and the rules of the rules component were synchronized.

5. The system of claim 2, wherein the client computing device is configured to automatically receive at least one of updated rules and new rules from the rules component.

6. The system of claim 2, wherein applying the security to the message comprises:
    providing a notification to the user device that the security has been triggered;
    providing an option to disable the triggered security;
    determining whether the option has been selected; and
    when the option is determined to be selected, preventing the triggered security from being applied to the message.

7. The system of claim 1, wherein the security allows exposure of a header portion and a subject portion of the message at the untrusted message service.

8. A messaging system comprising:
    a computing device using an untrusted message service for transmitting a message;
    a rules component associated with the untrusted message service, wherein the rules component is configured to analyze the message using one or more rules, wherein analyzing the message comprises:
        evaluating input during composition of the message;
        applying the one or more rules to the message;
        monitoring for changes to the input of the message; and
        when changes to the input are detected, reevaluating the input; and
    a security component associated with the computing device, wherein the security component is configured to apply the security to the message, wherein the security prevents a body portion of the message from being exposed at the untrusted message service when the message is transmitted, and wherein the security includes attaching one or more attributes of the security to the message, and wherein the security is applied in response to a determination that the untrusted message service is being used to send the message.

9. The system of claim 8, wherein the security component is associated with the computing device and the rules component is associated with the untrusted message service.

10. The system of claim 8, wherein the rules are used to determine when automatic protection is applied to the message and the level of protection applied to the message.

11. The system of claim 8, wherein the rules correspond to at least one of updated rules and new rules.

12. The system of claim 8, wherein the security allows exposure of a header portion and a subject portion of the message at the untrusted message service.

13. The system of claim 8, wherein the computing device and the security component are trusted and are located at one or more trusted locations.

14. The system of claim 8, wherein the one or more rules comprise at least one of a predicate, an action and configuration information.

15. A method of processing messages, the method comprising:
   receiving, by a computing device, a message from a client to a recipient;
   analyzing the message using rules from a rules component, wherein the rules are used to generate security for the message, and wherein analyzing the message comprises:
      evaluating input during composition of the message;
      applying the one or more rules to the message;
      monitoring for changes to the input of the message; and
      when changes to the input are detected, reevaluating the input;
   applying, by the computing device, the security to the message, wherein the security prevents a body portion of the message from being exposed at the untrusted message service, and wherein the security includes attaching one or more attributes of the security to the message, and wherein the security is applied in response to a determination that the untrusted message service is being used to send the one or more messages; and
   sending the message to the recipient using the untrusted message service.

16. The method of claim 15, further comprising:
   composing the message using the client computing device; and
   using the client computing device to transmit the secured message to the first recipient.

17. The method of claim 15, wherein the untrusted message service is configured to supply one or more of modified rules and new rules to the computing device to generate a security template.

18. The method of claim 15, wherein analyzing the message comprises:
   evaluating the first recipient of the message; and
   based on the evaluation, applying the one or more rules to the message.

19. The method of claim 18, wherein analyzing further comprises:
   receiving as input a second recipient of the message;
   evaluating the second recipient of the message; and
   based on the evaluation, applying a first rule in the one or more rules to the message and a second rule in the one or more rules to the message.

* * * * *